Aug. 7, 1956
A. CERETTI
2,758,048
METHOD FOR STRETCHING FIBROUS MATS
Filed May 21, 1952
6 Sheets-Sheet 1
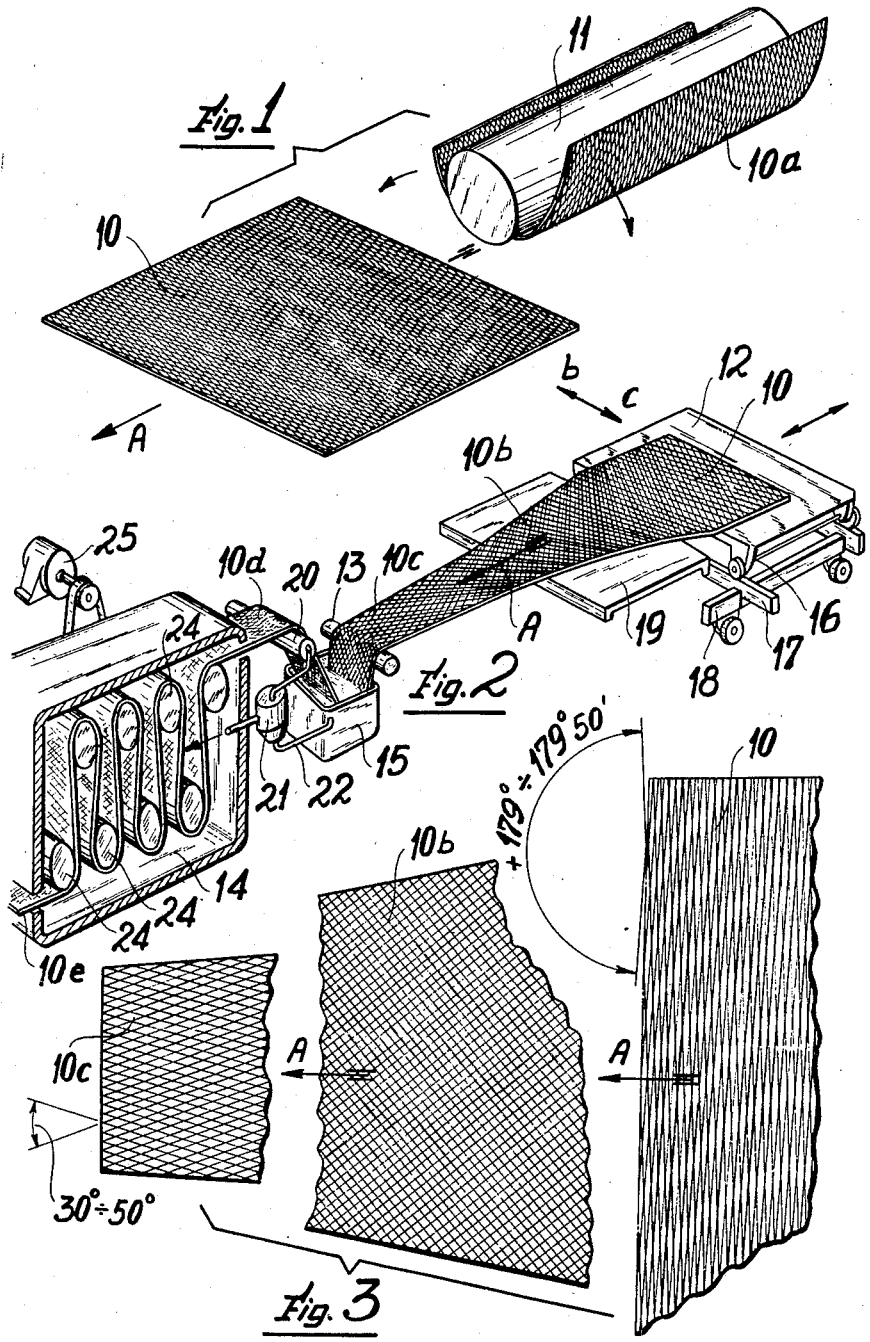
INVENTOR.
Aldo Ceretti
BY Michael S. Striker
Agt.

Aug. 7, 1956  A. CERETTI  2,758,048
METHOD FOR STRETCHING FIBROUS MATS
Filed May 21, 1952  6 Sheets-Sheet 2
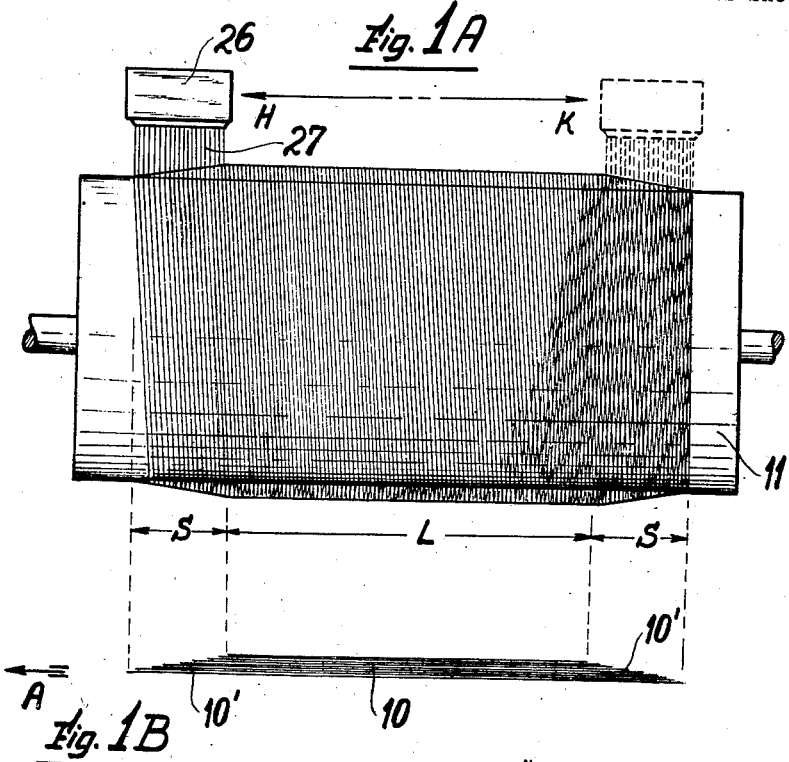
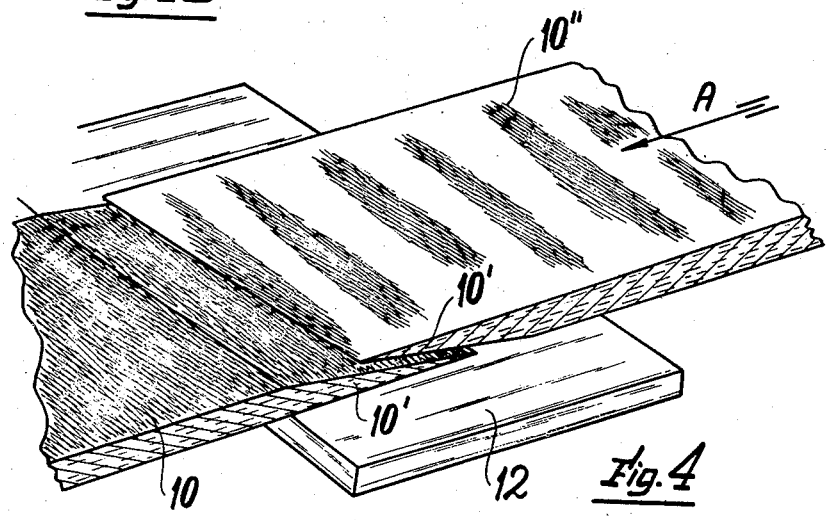
INVENTOR.
Aldo Ceretti Aug. 7, 1956  A. CERETTI  2,758,048
METHOD FOR STRETCHING FIBROUS MATS
Filed May 21, 1952  6 Sheets-Sheet 3
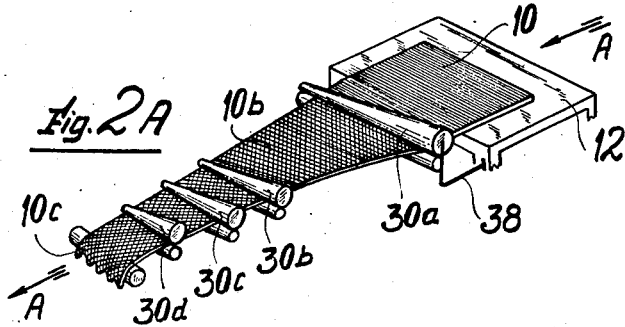
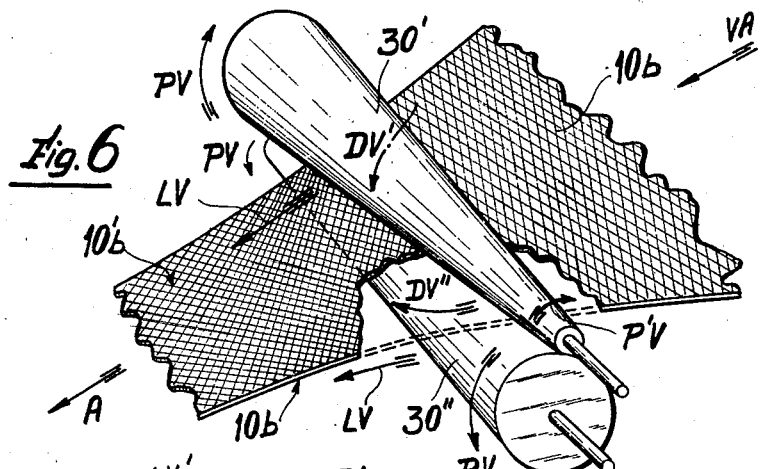
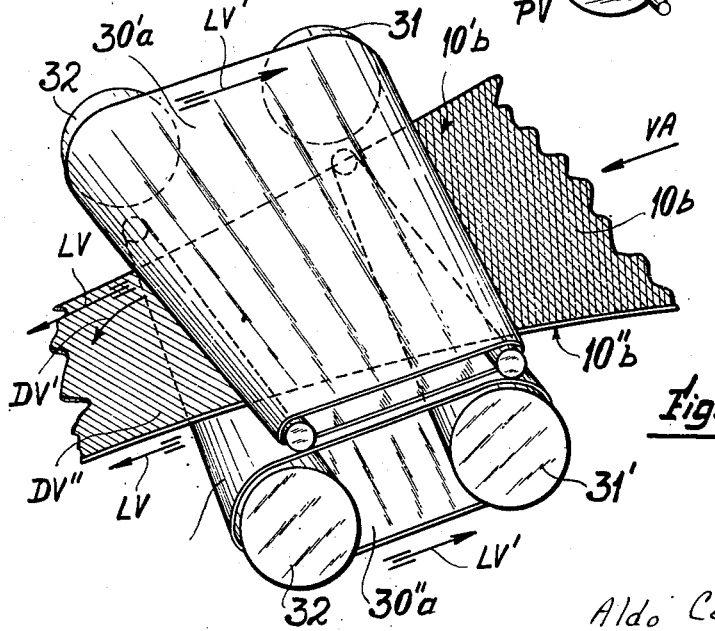
INVENTOR.
Aldo Ceretti
BY Michael S. Striker
agt.

Aug. 7, 1956
A. CERETTI
2,758,048
METHOD FOR STRETCHING FIBROUS MATS
Filed May 21, 1952
6 Sheets-Sheet 4
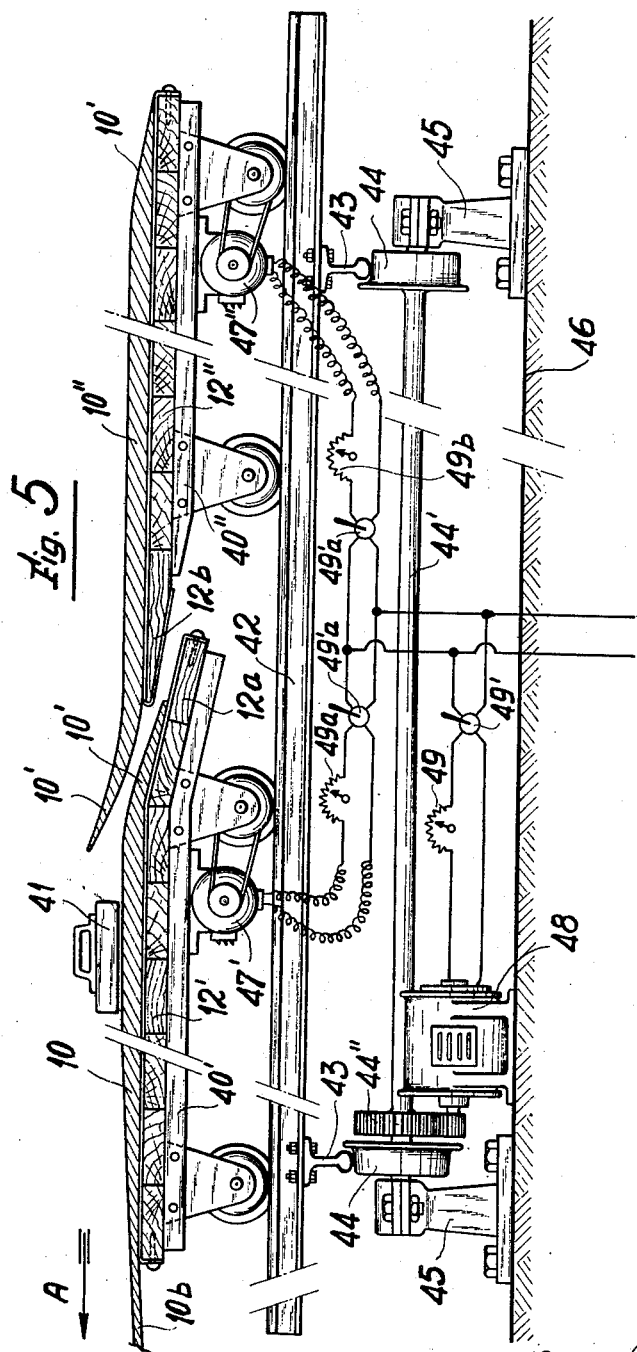
INVENTOR.
Aldo Ceretti
BY Michael S. Striker
agt.

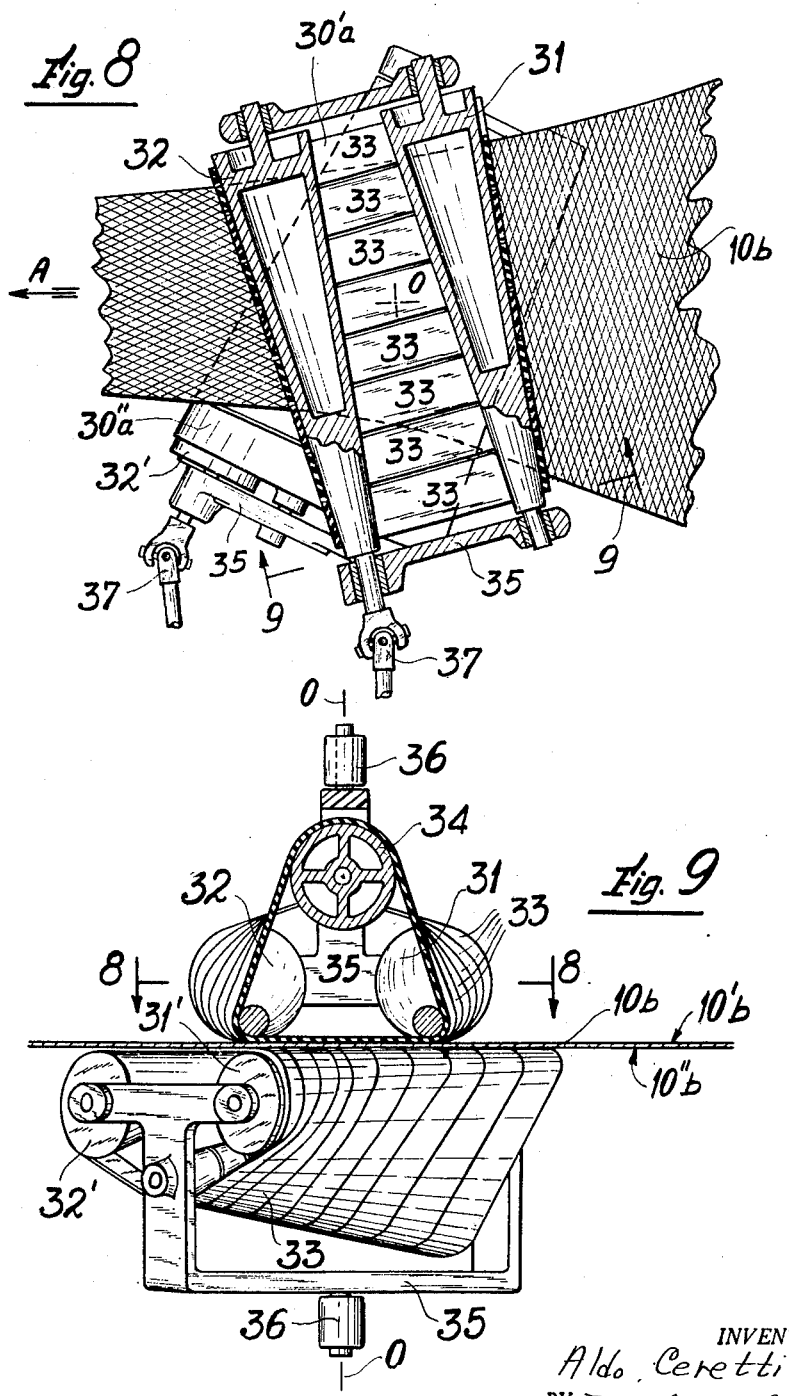

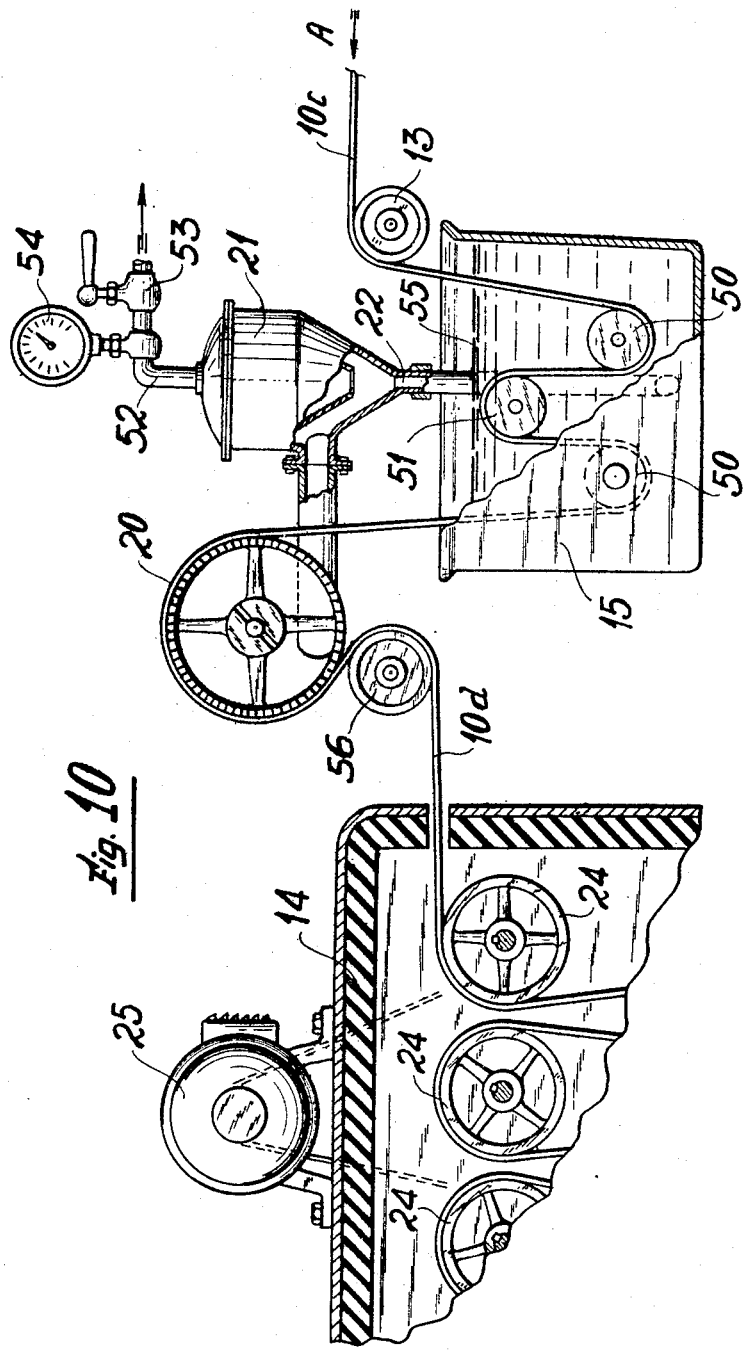

United States Patent Office 2,758,048
Patented Aug. 7, 1956

2,758,048
METHOD FOR STRETCHING FIBROUS MATS

Aldo Ceretti, Milan, Italy

Application May 21, 1952, Serial No. 289,099

Section 1, Public Law 690, August 8, 1946
Patent expires March 20, 1961

12 Claims. (Cl. 154—92)

The present invention relates to a method and apparatus for stretching fibrous mats, and more particularly to a method and apparatus for forming an elongated band having intercrossed fibers out of a mat having substantially parallel fibers.

The present application is a continuation-in-part of my copending application Serial No. 11,385, filed February 27, 1948, entitled "Continuous Spreading and Mangling Machine for Felt Strips," now abandoned.

The present invention is mainly concerned with the stretching of condensed mats of the type consisting of a plurality of layers of continuous glass filaments which are produced by a method which involves the drawing of continuous glass fibers from two furnaces reciprocated longitudinally of a drawing drum which is driven at a high speed relatively to the rate of reciprocation of the furnaces whereby the strands of several layers intersect at acute angles. When the mass has reached a desired thickness it is removed from the drum by severing longitudinally of the drum.

More specifically the present invention is concerned with the stretching and binding of mats of the type produced by a method and apparatus disclosed in my prior U. S. Patent No. 2,174,460, filed November 2, 1937, and granted September 26, 1939, and further disclosed in the U. S. Patent No. 2,546,230. Mats produced by this method consist of almost parallel fibers, and it is known to stretch such mats in the direction normal to the extension of the fibers so that the same may intercross and a narrower band may be formed.

However, the known methods of stretching the mats have the disadvantage that the band produced by stretching contains unexpanded fibrous agglomerations termed "ropes," which cause an irregular shape of the finished band. Another disadvantage of the known method is the limited length of the produced band.

It is the object of the present invention to overcome the disadvantages of the known methods for stretching fibrous mats and to provide a method and apparatus for producing elongated stretched bands consisting of regularly intercrossed fibers and having a uniform structure.

It is another object of the present invention to move the mat during the stretching of the same transversely, and/or forwardly or rearwardly in the direction of stretching so as to produce a symmetrical band and to assure uniform intercrossing of the fibers throughout the stretched band.

It is a further object of the present invention to provide means for rubbing the stretched portions of the mat along the longitudinal edge zones of the same in the direction of the stretching so as to effect intercrossing of the fibers of the produced band.

It is a still further object of the present invention to provide a method and apparatus for producing a band of any desired length from a plurality of mats by superimposing tapered end portions of mats and stretching such superimposed end portions in the same manner as the other portions of the mat.

It is also an object of the present invention to impregnate the stretched band with a liquid binding agent, and to remove by suction excessive amounts of such binding agent before the drying of the band.

With these objects in view the present invention mainly consists in a method of producing a fiber band having intercrossing fibers, such method comprising the steps of feeding a mat consisting of substantially parallel fibers in a direction normal to the fibers, stretching fed portions of the mat so as to form an elongated band, and moving the fed portions of the mat transversely and/or forwardly and rearwardly in the direction of stretching whenever irregularities in the stretched portions develop. A preferred method according to the present invention comprises also the steps of rubbing the stretched portions of the mat along the longitudinal edge zones of the same during stretching so as to effect intercrossing of the fibers and forming of a narrow elongated band. The stretched band is then inserted into a liquid binding substance, whereupon excessive amounts of the binding substance are removed by suction, and the band is dried.

According to one embodiment of the present invention the rubbing of the stretched portion is carried out by at least one pair of cooperating conical rollers engaging opposite faces of the band. The tapered end of each conical roller is arranged oppositely the wider end of the other conical roller, and one pair of end portions of the conical rollers engage one longitudinally extending edge zone of the stretched portion of the band and the other pair of end portions of the conical rollers engage the other longitudinally extending zone of the stretched portion of the band, the rotary speed and the direction of rotation of the conical rollers being such that the surface portion of the tapered roller ends move at a speed of the stretched portions of the band so that the surface portions of the wider ends of the conical rollers move at a higher speed and exert a rubbing action along the edges of the stretched portions so that the ends of the fibers are moved from the edge zones of the band toward the middle of the band whereby the fibers assume an intercrossing position.

According to another preferred embodiment of the present invention rubbing belts are provided which engage during stretching the stretched portions of the band along the edges of the same. Such rubbing belts are moved by conical rollers faster than the edge zones of the stretched portions so as to effect intercrossing of the fibers.

According to another embodiment of the invention the conical rollers, and the rubbing belt may be adjustable so that the direction of rubbing may be adjusted with respect to the direction of stretching of the fibrous band.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows a fibrous mat before stretching;

Fig. 1a shows the mat in the process of being produced;

Fig. 1b is a longitudinal section through a mat;

Fig. 2 is a diagrammatic view showing the apparatus of the present invention;

Fig. 2a shows the arrangement of a set of conical rubbing rollers;

Fig. 3 shows the intercrossing of the fibers of stretched mats;

Fig. 4 shows the superimposing of tapered end portions of two mats;

Fig. 5 is a side view of a carriage means supporting the mats;

Fig. 6 shows a pair of conical rubbing rollers;

Fig. 7 shows cooperating rubbing belts;

Fig. 8 is a plan view of a pair of adjustable rubbing devices;

Fig. 9 is a side view of the rubbing devices shown in Fig. 8; and

Fig. 10 is a side view, partly in section, of the apparatus for immersing the stretched band into a binding substance and for drying the same.

Referring now to the drawings and more particularly to Figs. 1, 1a and 1b, the mat 10 is produced by reciprocating the furnaces at 26 longitudinally of the drum 11 which rotates at a very high speed so that glass filaments 27 drawn from the furnaces 26 extend almost parallel in the mat 10 which is separated from the drum 11 by longitudinally cutting it. Due to the particular movement of the furnaces the ends 10' of the mass 10 are tapered as can be clearly seen from Fig. 1b. This method of producing a fibrous mat is not an object of the present invention and is the subject matter of my prior U. S. Patent No. 2,174,460.

In the direction of the arrow A in Figs. 1 and 3 the angles between the fibers are 170° to 170° 50' and therefore the fibers may be considered as substantially parallel.

According to the present invention the mat is stretched in the direction of the arrow A so that the stretched portions 10b and 10c consist of fibers which intercross as the stretching proceeds so that the fibers in the stretched band 10c, in Fig. 3 extend at angles of 30° to 50°. While the portion on the right side of Fig. 3 is not self-sustaining the stretched band has a high tensile strength.

The method and the apparatus for carrying out the stretching of the fibrous mass is diagrammatically shown in Fig. 2. The mat 10 is supported on the carriage means 12 which is movable in the direction of the arrows b, c transversely to the direction of stretching indicated by arrow A on rails 17. Rails 17 are supported on supporting rails 18 which are movable in the longitudinal direction of stretching. Since the mat is not self-supporting as long as the fibers are not intercrossing preferably a table 19 is provided supporting the intermediate portion 10b of the band. Rollers 13, 20 and 24 are provided and at least one of these rollers is driven to exert a stretching action on the portions 10c and 10b of the mat. The stretched band is guided through a container 15 containing a liquid binding substance, and a suction means 21 is provided for sucking off excessive amounts of the binding liquid from the perforated roller 20, and for returning the sucked off binding liquid to the container 15 through the conduit 22. In a dryer 14 the portion 10d is dried while passing around the drums 24 which are driven by an electric motor 25. 10e indicates the dried finished band. In addition to the drums 24 the roller 13 may be driven, or additional driven rollers provided for stretching the band.

The mat 10 may be held on the carriage 12 by friction and the top face of the carriage may be provided with a suitable surface for frictionally engaging the mat. In addition thereto, heavy weights may be placed on top of the mat. During the stretching, portions of the mat are consecutively manually fed in the direction of stretching.

The longitudinal stretching of fibrous mats of the type described produces frequently irregular and unsymmetrical bands when the known methods are employed since some of the fibers resist separation so that the stretched mat comprises unexpanded fiber agglomerations, while other portions of the band offer very little resistance to expansion. Consequently a wavy band is produced which is asymmetrical in longitudinal or transversal direction.

According to the method of the present invention such irregular structure of the stretched band may be avoided by moving the carriage 12 transversely, and if necessary longitudinally with respect to the direction of stretching so that an edge zone of the stretched portion which has a higher resistance against expansion may be subjected to a greater tensile force. Thereby an asymmetric shape of the band with respect to the longitudinal axis of the same can be corrected which is of great importance since only a perfectly straight band can be longitudinally cut into a plurality of strips which are commercially valuable products.

Small movements of the carriage in the direction of the arrow A and oppositely thereto for about three to five feet, and transversal movements for two to three feet in the direction of the arrow b, c in Fig. 2 are sufficient for obtaining a perfectly straight band.

Referring now to Fig. 5 which illustrates the carriage means for moving the mat longitudinally and transversely, a carriage 40' is provided with a top 12' on which the mat 10 is frictionally held and weighted down by a weight means 41. The carriage 40' and a second carriage 40", the purpose of which will be explained hereinafter, are movable in the direction of stretching on rails 42, which are fixedly secured to transversely extending rails 43. An electric motor 48 drives a shaft 44' by means of gears 44". Shaft 44' is rotatably mounted in bearings 45 which are fixedly secured to a supporting base 46. Fixedly mounted on the shaft 44' are two rollers 44 which support and move the transversal rails 43. Electric motors 47' and 47" are mounted on the carriages and drive the same. The electric motor 48 is provided with a starting resistor 49 and a reversing switch 49', while the motors 47' and 47" are provided with starting resistors 49a and 49b are reversing switches 49'a, 49'b. When motor 47' is switched on, the carriage 40' can be forwardly and rearwardly moved by means of the reversing switch 49'a. When motor 48 is switched on the rails 42 and thereby the carriages 40' and 42' can be reciprocated in a transversal direction. As explained above it is possible to correct irregularities in the stretched band by longitudinal and/or transversal movement of the carriage 40' which supports and frictionally holds the mat 10.

The length of a band produced from a single mat is limited. In order to produce a continuous band consisting of a plurality of mats the ends of two mats are superimposed.

As shown in Fig. 1b, the ends 10' of a mat 10 produced by reciprocating furnaces on a rotating drum are tapered. As shown in Fig. 4, two mats, with the tapered ends 10' superimposed in proper position, form a sheet of constant thickness. The properties of the mats are such that the superimposed tapered ends 10' of two mats adhere to each other and form a single felted mat if pressed together. Mats connected in this manner can be gradually fed to stretching devices and are transformed into a continuous band in which the joint is not noticeable. In order to obtain a continuous process the top 12' of the carriage 40' is provided with a downwardly inclined portion 12a, while the top 12" of the carriage 40" is provided with a tapered end portion 12b so that the carriage 40' and 40" when pushed together have top surfaces located in one plane. Consequently the tapered end portion 10' of a mat supported by the top 12' and 12a projects below the tapered end 10' of a mat 10" placed on the second carriage 40", and the tapered end portions of two consecutive mats can be easily superimposed and pressed together so as to form a joint sheet. Such joining of two mats is carried out when the greater part of a mat placed on the carriage 12' has been stretched so that the joint end portions of the mats may be fed over the top 12' to the stretching devices while the second mat 10" which was supported by the carriage 12" is gradually moved to carriage 12' so that the carriage 40" may be separated from carriage 40' and provided with the next mat. The movement of the carriage 12" on the rails 42 is effected by means of motor 47" while motor 47' is mainly used for correcting irregularities during the stretching process.

While a joint sheet is supported by both carriages, the carriages may be moved together longitudinally and transversely for correcting irregularities in the stretched band.

Instead of using electric motors for driving the carriages and for transversely moving the same, lighter carriages may be moved manually.

Referring now to Fig. 10 which illustrates the means for stretching the mat and for impregnating and drying the same, a roller 13 guides the stretched band 10c downwardly into a container 15 which contains a liquid binding substance. Rollers 50 and 51 are provided about which the band is guided so as to be repeatedly bent in opposite directions. While the fibrous band is passing over the relatively small rollers 50 and 51, the outwardly located surface portions of the band are stretched so that the binding liquid penetrates deeply into the fibrous mass. The band is then guided over a perforated drum 20, an idle roller 56 being provided to guide the band around almost the entire perimeter of the drum 20. A separator 21 is connected at the upper end thereof through a pipe 52 to a suction means which may be shut off by the valve 53, the pressure being indicated by indicator 54. Pipes 21' connect the interior of the drum to the separator 21 so that an excessive amount of the binding liquid may be sucked into the separator 21 and flows back into the container 50 while the air, which is sucked through the wet band into the perforated drum 20, leaves through pipe 52.

The liquid binding substance may be an emulsion, or a water dispersion having a thermo-setting character, such as acrylic resins, urea-formaldehyde resins, phenolformaldehyde resins, polyvinyl alcohols, or plain starch thermo-setting glues.

While it is known to apply such binding substances to fibrous mats of the type described, considerable difficulties have been encountered in providing the fibrous mats with exactly the right amount of the binding substance. If there is too little applied, the binding agent does not penetrate completely into the material while an excessive amount of binding agent results in excessive weight of the product and higher costs, and moreover makes the material undesirably stiff and rigid.

These disadvantages are overcome by the above-described method and apparatus, since the guiding rollers 50 and 51 hold the band for a considerable time in contact with the binding agent and expand the surface of the mat so as to effect a complete penetration of the binding substance into the fibrous band, while the excessive amount of the binding agent is removed by suction and returned to the container. By regulating the force of suction, the amount of the binding liquid remaining in the fibrous band can be exactly determined. The wet portion 10d of the band passes from roller 56 over rollers 24 into a dryer 14 and is completely dried. A motor 25 drives the rollers 24. The means for heating the dryer and supplying the same with dry air are well-known, and therefore not shown in Fig. 10.

While the transversely and longitudinally movable carriage means are extremely valuable for the formation of a symmetrical band, the quality of such band may be further improved by rubbing the edge zones of the stretched portions of the band in direction of stretching. By causing the ends of the fibers located along the edges of the band to move faster than the center portion of the stretched band the intercrossing of the fibers to form angles of about 30° is aided.

Although the rubbing action may be only applied to the faces of the stretched band, it has been found that the inner layers follow the movement of the fibers in the rubbed surface layers of the band and are also re-arranged at the desired angles. Since the fibers of the inner layers are re-arranged together with the fibers of the outer layers, it is possible to exert a rubbing action on one face of the band along one longitudinal edge zone, and on the other face of the band along the other longitudinal edge zone only, and nevertheless to obtain a proper re-arrangement and intercrossing of all fibers in the stretched band.

Referring now to Fig. 6 which shows a simple device for exerting a rubbing action on both edge zones of a stretched band 10b, two conical rollers 30' and 30" are arranged with their axes substantially perpendicular to the direction of stretching indicated by arrow A, and engaging the upper face 10'b, and the lower face 10"b, respectively, of the stretched portion 10b of the fibrous mat. The conical rollers 30' and 30" are rotated by suitable means, not shown, at such a rotary speed that the tapered ends of each roller have a peripheral speed P'V substantially equal to the speed VA at which the band moves due to the stretching. Consequently, the tapered ends of the rollers exert no rubbing action on the corresponding edge zones of the stretched band. The wider ends of the conical rollers move at a higher peripheral speed and therefore faster than the edge zone of the stretched band which they engage. In the arrangement shown in Fig. 6 the upper face 10'b of the band is rubbed by conical roller 30' along one edge, while the lower face 10"b of the band is rubbed along the other edge of the band by roller 30". The higher speeds of the wider ends of the conical rollers result in a tendency of the ends of the fibers located in the edge zones of the bands to move faster than the fiber portions in the middle of the band and this tendency together with the stretching of the band which has a "lazy tongs" action on the fibers effects a precise intercrossing of the fibers. As pointed out above, the fibers located in the inner layers of the band are rearranged together with the fibers in the surface layers.

Preferably a set of several pairs of conical rollers is provided, as shown in Fig. 2a, so that the fibers will be guided reliably into an intercrossing position during the stretching of the band.

The number of pairs of cooperating rollers may be varied, as required, five or six being sufficient in most cases, however, an excessively strong rubbing action of each rubbing device should be avoided, and preferably the rubbing pressure is distributed over several rubbing devices. As shown in Fig. 2a the rubbing devices 30b, 30c and 30d are arranged spaced from the supporting surface 12, in order to permit transversal and longitudinal movement of the portion 10b of the stretched mass for the correction of irregularities. A further rubbing device 13a may be arranged adjacent to the supporting table 12 on brackets 38, which is particularly advantageous if mats having almost parallel fibers are expanded since the parallel fibers are urged at the beginning of the stretching operation to start moving to an intercrossing position which is gradually obtained by the "lazy tongs" action of the stretching process.

The roller pair 30a may be driven at a rotary speed producing a peripheral speed of the roller surfaces which is lower than the speed of the stretched band so that the material is held back by the rollers 30a instead of by the friction of the surface 12. Instead of the table 12 a conveyer means may be used to feed the mats into the pair of rollers 38, as disclosed in U. S. Patent application Serial No. 11,358. In the event that the holding back against the stretching force is performed by a pair of cooperating rollers 38 the transversal and longitudinal movements for correcting irregularities in the stretched band are applied to the rollers. It is obvious that more than one pair of rollers 30a may be provided and supported on the movable carriage 40'.

According to another embodiment of the present invention, rubbing belts engage the surface of the stretched mat portion.

As shown in Fig. 7, conveyer-like belts 30'a and 30"a frictionally engage the faces 10'b and 10"b of the stretched portion 10b of the mat. Each belt is driven by a pair of conical rollers 31 and 32, and 31' and 32', respectively, and similar to the device shown in Fig. 6, the peripheral surface portions of the wider ends of the conical rollers move at a speed LV' which is higher than the speed LV of the stretched mat portion 10b so as to effect a faster movement of the corresponding belt portions exceeding the speed of the corresponding edge zone of the band and to exert a rubbing action on the same while the tapered ends of the conical rollers move the belt at a speed corresponding to the speed LV of the corresponding other edge zone of the stretched band. A rubbing device as shown in Fig. 7 is more effective than the rubbing device shown in Fig. 6 since a greater surface portion of the stretched band is exposed to the rubbing action. Moreover, while the conical rollers according to Fig. 6 must have parallel axes, and extend normal to the direction of stretching, the rubbing devices according to Fig. 7 permit adjusting of the relative position of the belt 30′a and the belt 30″a, and also adjusting of the angle between the direction of movement of the belt and the direction in which the mat is being stretched. It is clear that the fibers will be forced to an intercrossing position more effectively, if the belts exert an inwardly directed rubbing action. The arrows DV′ and DV″ indicate the directions in which the fiber ends are forced by the action of the inwardly moving rubbing belt portions.

Figs. 8 and 9 illustrate a preferred embodiment of the rubbing device according to the present invention which permits an adjusting of the direction of the rubbing action. Instead of one belt, a plurality of belts 33 are provided which pass around pairs of conical rollers 31, 32 and 31′, 32′, respectively. The conical rollers 31, 32 and conical idle roller means 34 are rotatably mounted in a support 35 which is rotatably supported at 36 for movement about an axis extending normal to the plane of the stretched band and indicated at O in Fig. 8. Each conical idle roller means 34 consists of a plurality of narrow coaxially arranged frusto-conical rollers, each supporting one of the belts 33′ and rotating at a different speed due to the conical shape of the rollers 31 and 32. The portions of the conveyer-like belts 33 between the rollers 31 and 32 and the rollers 31′ and 32′ frictionally engage the upper face 10′b, and the lower face 10″b, respectively, of the stretched portion of the mat 10b. By rotating each of the supports 35 about the axis O, the direction of the rubbing may be varied, as required. As in the above-described devices, the wider ends of the conical rollers have a higher peripheral speed than the tapered ends of the conical rollers so that the conveyer-like belts 33 passing about the wider ends of the conical rollers move at a higher speed, exerting a rubbing action on the stretched portions of the mat.

The rollers of the rubbing devices may be driven by suitable means such as electric motors, and being rotated through universal joints 37.

The conveyer-like rubbing belts may be made of any suitable resilient material such as rubber which may be reinforced by cotton fibers. The resiliency of the rubbing belts assures a good fit of the belts on the conical rollers.

It will be understood that each of the elements described above, or two or more together, may also find a useful application in other types of methods for stretching fibrous mats differing from the types described above.

While the invention has beeen illustrated and described as embodied in a method and apparatus for forming an elongated band having intercrossed fibers out of a mat having substantially parallel fibers by stretching and rubbing the mat normal to the direction of the fibers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a fiber band having intercrossing fibers, comprising, in combination, the steps of feeding in a longitudinal direction a band having intercrossing almost parallel fibers extending transversely to the longitudinal extension of said band; stretching consecutive portions of the thus fed band in said longitudinal direction; and simultaneously rubbing in said longitudinal direction at least one face of the stretched portions along at least one longitudinal edge of said band for moving said fibers into an intercrossing position in which said fibers extend obliquely to said transverse and longitudinal directions.

2. A method of producing a fiber band having intercrossing fibers, comprising, in combination, the steps of feeding a mat consisting of intercrossing almost parallel fibers in a direction normal to said fibers; consecutively stretching fed portions of said fiber mat in said direction so as to form an elongated band; and during stretching rubbing in said direction at least one face of the stretched portion of said fiber mat along the longitudinal edges of said thus formed band for moving said fibers into an intercrossing position in which said fibers extend obliquely to the initial position thereof.

3. A method of producing a fiber band having intercrossing fibers, comprising, in combination, the steps of feeding a mat consisting of intercrossing almost parallel fibers in a direction normal to said fibers; consecutively stretching fed portions of said fiber mat in said direction so as to form an elongated band; and during stretching rubbing in said direction one face of the stretched portion of said fiber mat along one longitudinal edge extending in the direction of stretching, and the other face of said stretched portion along the other longitudinal edge of the same for moving said fibers into an intercrossing position in which said fibers extend obliquely to the initial position thereof.

4. A method of producing a fiber band having intercrossing fibers, comprising, in combination, the steps of feeding a mat consisting of intercrossing almost parallel fibers in a direction normal to said fibers; consecutively stretching fed portions of said fiber mat in said direction so as to form an elongated band; during stretching rubbing in said direction at least one face of the stretched portion of said fiber mat along the longitudinal edges of said thus formed band for moving said fibers into an intercrossing position in which said fibers extend obliquely to the initial position thereof; immersing said stretched band into a liquid binding substance; removing by suction excessive amounts of said binding substance not absorbed by said band; and drying said band.

5. A method of producing a fiber band comprising, in combination, the steps of continuously pulling by pulling means a fiber band substantially in the longitudinal direction thereof, said fiber band consisting of intercrossing almost parallel fibers extending substantially normal to the direction of pulling; and holding said pulled band at a transverse holding zone spaced from said pulling means so that the band portion between said pulling means and said transverse holding zone is under tension and thereby stretched and narrowed during pulling, while said fibers are moved to a final intercrossing position extending obliquely to the initial position thereof; and varying the position of said transverse holding zone so as to vary the tension exerted by said pulling means on various zones of said stretched band portion between said transverse holding zone and said pulling means for varying and adjusting the stretch obtained in various zones of said band during pulling so as to compensate for irregularities in the positions of said intercrossing fibers.

6. A method of producing a fiber band comprising in combination, the steps of continuously pulling by pulling means a fiber band substantially in the longitudinal direction thereof, said fiber band consisting of intercrossing almost parallel fibers extending substantially normal to the direction of pulling; holding said pulled band at a transverse holding zone spaced from said pulling means so that the band portion between said pulling means and said transverse holding zone is under tension and thereby stretched and narrowed during pulling, while said fibers are moved to a final intercrossing position extending obliquely to the initial position thereof; and moving said transverse holding zone in a direction transverse to said direction of pulling so as to vary the tension exerted by said pulling means on longitudinal extending zones located along the longitudinal edges of said stretched band portion between said transverse holding zone and said pulling means for varying and adjusting the stretch obtained in various zones of said band during pulling so as to compensate for irregularities in the positions of said intercrossing fibers.

7. A method of producing a fiber band comprising, in combination, the steps of continuously pulling by pulling means a fiber band substantially in the longitudinal direction thereof, said fiber band consisting of intercrossing almost parallel fibers extending substantially normal to the direction of pulling; holding said pulled band at a transverse holding zone spaced from said pulling means so that the band portion between said pulling means and said transverse holding zone is under tension and thereby stretched and narrowed during pulling, while said fibers are moved to a final intercrossing position extending obliquely to the initial position thereof; and moving said transverse holding zone transversely to said direction of pulling, and rearwardly and forwardly in said direction of pulling so as to vary the tension exerted by said pulling means on various zones of said stretched band portion between said transverse holding zone and said pulling means for varying and adjusting the stretch obtained in various zones of said band during pulling so as to compensate for irregularities in the positions of said intercrossing fibers.

8. A method of producing a fiber band comprising, in combination, the steps of continuously pulling by pulling means a fiber band substantially in the longitudinal direction thereof, said fiber band consisting of intercrossing almost parallel fibers extending substantially normal to the direction of pulling; holding said pulled band at a transverse holding zone spaced from said pulling means so that the band portion between said pulling means and said transverse holding zone is under tension and thereby stretched and narrowed during pulling, while said fibers are moved to a final intercrossing position extending obliquely to the initial position thereof; rubbing in said direction of pulling at least one face of said stretched band portion along the longitudinal edges of said stretched band portion so as to urge said fibers to move to said final intercrossing position; and varying the position of said transverse holding zone so as to vary the tension exerted by said pulling means on various zones of said stretched band portion between said transverse holding zone and said pulling means for varying and adjusting the stretch obtained in various zones of said band during pulling so as to compensate for irregularities in the positions of said intercrossing fibers.

9. A method of producing a fiber band comprising, in combination, the steps of continuously pulling by pulling means a fiber band substantially in the longitudinal direction thereof, said fiber band consisting of intercrossing almost parallel fibers extending substantially normal to the direction of pulling; holding said pulled band at a transverse holding zone spaced from said pulling means so that the band portion between said pulling means and said transverse holding zone is under tension and thereby stretched and narrowed during pulling, while said fibers are moved to a final intercrossing position extending obliquely to the initial position thereof; rubbing in said direction of pulling at least one face of said stretched band portion along the longitudinal edges of said stretched band portion so as to urge said fibers to move to said final intercrossing position; and moving said transverse holding zone in a direction transverse to said direction of pulling so as to vary the tension exerted by said pulling means on longitudinally extending zones located along the longitudinal edges of said stretched band portion between said transverse holding zone and said pulling means for varying and adjusting the stretch obtained in various zones of said band during pulling so as to compensate for irregularities in the positions of said intercrossing fibers.

10. A method of producing a fiber band comprising, in combination, the steps of continuously pulling by pulling means a fiber band substantially in the longitudinal direction thereof, said fiber band consisting of intercrossing almost parallel fibers extending substantially normal to the direction of pulling; holding said pulled band at a transverse holding zone spaced from said pulling means so that the band portion between said pulling means and said transverse holding zone is under tension and thereby stretched and narrowed during pulling, while said fibers are moved to a final intercrossing position extending obliquely to the initial position thereof; rubbing in said direction of pulling at least one face of said stretched band portion along the longitudinal edges of said stretched band portion so as to urge said fibers to move to said final intercrossing position; and moving said transverse holding zone transversely to said direction of pulling, and rearwardly and forwardly in said direction of pulling so as to vary the tension exerted by said pulling means on various zones of said stretched band portion between said transverse holding zone and said pulling means for varying and adjusting the stretch obtained in various zones of said band during pulling so as to compensate for irregularities in the positions of said intercrossing fibers.

11. A method of producing a fiber band comprising, in combination, the steps of continuously pulling by pulling means a fiber band substantially in the longitudinal direction thereof, said fiber band consisting of intercrossing almost parallel fibers extending substantially normal to the direction of pulling; holding said pulled band at a transverse holding zone spaced from said pulling means so that the band portion between said pulling means and said transverse holding zone is under tension and thereby stretched and narrowed during pulling, while said fibers are moved to a final intercrossing position extending obliquely to the initial position thereof; rubbing in said pulling direction one face of said stretched band portion along one longitudinal edge of said stretched band portion, and the other face of said stretched band portion along the other longitudinal edge of the same so as to urge said fibers to move to said final intercrossing position; and moving said transverse holding zone in a direction transverse to said direction of pulling so as to vary the tension exerted by said pulling means on longitudinally extending zones located along the longitudinal edges of said stretched band portion between said transverse holding zone and said pulling means for varying and adjusting the stretch obtained in various zones of said band during pulling so as to compensate for irregularities in the positions of said intercrossing fibers.

12. A method of producing a fiber band comprising, in combination, the steps of continuously pulling by pulling means a fiber band substantially in the longitudinal direction thereof, said fiber band consisting of intercrossing almost parallel fibers extending substantially normal to the direction of pulling; holding said pulled band at a transverse holding zone spaced from said pulling means so that the band portion between said pulling means and said transverse holding zone is under tension and thereby stretched and narrowed during pulling, while said fibers are moved to a final intercrossing position extending obliquely to the initial position thereof; rubbing in said pulling direction one face of said stretched band portion along one longitudinal edge of said stretched band portion, and the other face of said stretched band portion along the other longitudinal edge of the same so as to urge said fibers to move to said final intercrossing position; and moving said transverse holding zone transversely to said direction of pulling, and rearwardly and forwardly in said direction of pulling so as to vary the tension exerted by said pulling means on various zones of said stretched band portion between said transverse holding zone and said pulling means for varying and adjusting the stretch obtained in various zones of said band during pulling so as to compensate for irregularities in the positions of said intercrossing fibers.

References Cited in the file of this patent

UNITED STATES PATENTS

| | | |
|---|---|---|
| 2,081,060 | Modigliani | May 18, 1937 |
| 2,217,607 | Anderson | Oct. 8, 1940 |
| 2,318,120 | Whitehead | May 4, 1943 |
| 2,415,023 | Novotny | Jan. 28, 1947 |
| 2,486,217 | Slack et al. | Oct. 25, 1949 |
| 2,512,762 | Benson | June 27, 1950 |
| 2,563,756 | Swallow | Aug. 7, 1951 |